US008942737B2

(12) United States Patent
Jeong

(10) Patent No.: US 8,942,737 B2
(45) Date of Patent: Jan. 27, 2015

(54) LOCATION MEASURING METHOD AND APPARATUS USING ACCESS POINT AND LAMP

(75) Inventor: Seung-Hyuk Jeong, Seoul (KR)

(73) Assignee: KT Corporation, Seongnam (KR)

(*) Notice: Subject to any disclaimer, the term of this patent is extended or adjusted under 35 U.S.C. 154(b) by 336 days.

(21) Appl. No.: 13/311,163

(22) Filed: Dec. 5, 2011

(65) Prior Publication Data
US 2012/0172051 A1 Jul. 5, 2012

(30) Foreign Application Priority Data
Dec. 31, 2010 (KR) ........................ 10-2010-0140371

(51) Int. Cl.
H04W 24/00 (2009.01)
G01S 5/02 (2010.01)
G01S 1/70 (2006.01)
H04W 64/00 (2009.01)

(52) U.S. Cl.
CPC ...... G01S 5/02 (2013.01); G01S 1/70 (2013.01); H04W 64/00 (2013.01)
USPC ..................... 455/456.6; 455/456.1; 342/450; 342/463

(58) Field of Classification Search
CPC ... H04W 64/00; H04W 4/02; H04L 29/08657
USPC ............ 455/456.1–457, 423, 67.11; 342/450, 342/463
See application file for complete search history.

(56) References Cited

U.S. PATENT DOCUMENTS

| 7,403,120 | B2 * | 7/2008 | Duron et al. ................ 340/572.1 |
| 2007/0184851 | A1 * | 8/2007 | Barnwell et al. ............ 455/456.1 |
| 2007/0279281 | A1 * | 12/2007 | Oda et al. ................. 342/357.06 |
| 2010/0265092 | A1 | 10/2010 | Kim et al. |

FOREIGN PATENT DOCUMENTS

| KR | 20060022291 A | 3/2006 |
| KR | 20090055104 A | 6/2009 |
| WO | 2005004528 A1 | 1/2005 |
| WO | 2007056738 A2 | 5/2007 |

* cited by examiner

Primary Examiner — Marcos Torres
(74) Attorney, Agent, or Firm — Sughrue Mion, PLLC

(57) ABSTRACT

Measuring a location of a communication terminal using a wireless local area access point based on location coordinates of the access points and location information of a nearby lamp.

17 Claims, 11 Drawing Sheets

FIG. 4

| GROUP | TIME | LOCATION(LATITUDE/LONGITUDE) | MAC ADDRESS | RSSI | cell ID |
|---|---|---|---|---|---|
| 1 | AM 9.10 | 12/15 | 111.111 | -50dB | 1 |
| | | | 111.112 | -40dB | |
| | | | 111.113 | -70dB | |
| | | | 111.114 | -100dB | |
| 2 | AM 9.13 | 13/15 | 111.117 | -50dB | 1 |
| | | | 111.112 | -50dB | |
| | | | 111.118 | -70dB | |
| | | | 111.119 | -100dB | |
| 3 | AM 9.15 | 14/15 | 111.121 | -40dB | 2 |
| | | | 111.112 | -80dB | |
| | | | 111.111 | -90dB | |
| | | | 111.114 | -100dB | |
| 4 | AM 9.17 | 15/17 | 111.121 | -50dB | 1 |
| | | | 111.112 | -80dB | |
| | | | 111.127 | -70dB | |
| | | | 111.129 | -70dB | |
| ⋮ | ⋮ | ⋮ | ⋮ | ⋮ | ⋮ |
| N-1 | AM 11.11 | 20/21 | 111.113 | -60dB | 1 |
| | | | 111.112 | -40dB | |
| | | | 111.118 | -70dB | |
| | | | 111.117 | -80dB | |
| N | AM 11.13 | 30/25 | 111.131 | -50dB | 1 |
| | | | 111.122 | -40dB | |
| | | | 111.133 | -70dB | |
| | | | 111.111 | -100dB | |

410, 430, 450, 470, 490

(a)

(b)

| NUMBER OF APs | CORRECTION RATIO (AP COORDINATE : LAMP COORDINATE) |
|---|---|
| 21 OR HIGHER | 2 : 1 |
| 16 ~ 20 | 3 : 2 |
| 11 ~ 15 | 1 : 1 |
| 6 ~ 10 | 1 : 2 |
| 2 ~ 5 | 1 : 3 |
| 1 | 1 : 4 |

LOCATION MEASURING METHOD AND APPARATUS USING ACCESS POINT AND LAMP

CROSS-REFERENCE TO RELATED APPLICATION

This application claims priority from Korean Patent Application No. 10-2010-0140371, filed on Dec. 31, 2010, in the Korean Intellectual Property Office, the disclosure of which is incorporated herein by reference in its entirety.

BACKGROUND

1. Field

Exemplary embodiments relate to a technique for measuring a location of a communication terminal, and more particularly, to a location measuring method and apparatus using an access point of a wireless local area network (WLAN) and a lamp.

2. Description of the Related Art

With the development of mobile communication techniques, studies have been actively made on location measuring techniques that measure a location of a mobile terminal in a communication network. Typically, a global positioning system (GPS)-based location measuring technique using satellites has been widely used.

The GPS-based location measuring technique has a disadvantage of having to mount a GPS receiver on a mobile terminal. Also, because the GPS-based location measuring technique was developed by the U.S. Department of Defense for military use, a high-precision GPS-based location measuring technique is not disclosed. Furthermore, the GPS-based location measuring technique has limited use since the technique is useless in buildings, for example, houses, offices, or shops, where satellite signals cannot be received. To overcome these drawbacks, attempts have been made to measure a location of a terminal using an access point for a WLAN service.

The WLAN service enables users of mobile terminals to wirelessly connect to the Internet through a WLAN access point near the mobile terminals, for example, notebook computers, personal digital assistants (PDAs), smart phones, and the like, that have WLAN cards mounted therein. Recently, to meet the increasing demand for the WLAN service, installation of access points in buildings, such as large-scaled shopping malls, and the like, has increased.

Since many access points have now been installed in buildings, a location of a mobile terminal can be measured in buildings where a GPS-based location measuring technique cannot be applied by using the access points.

Accordingly, research and development on a location measuring technique using an access point for a WLAN service has recently been flourishing.

Meanwhile, lamps create a very important life environment for human beings and provide light so that the human eye can obtain visual information where it would otherwise at times be difficult to recognize anything without the help of the lamps. The recent development of lighting techniques does more than just the basic function of helping to obtain visual information, but enables lamps to offer an improved function for stimulating the human emotion. Among a various kinds of lamps having been developed, a typical example is light emitting diodes (LEDs).

The lamps are installed outdoors and indoors, and not only serve to simply emit light in the dark, but light control technologies enable the lamps to emit transformed light including an identity code to control the arrangement of the lamps. Research and development of light control technologies has been under way.

SUMMARY

Aspects of the exemplary embodiments are directed to providing a method and apparatus for measuring a location of a communication terminal using an access point of a wireless local area network (WLAN) and a lamp.

Additional aspects will be set forth in the following description, and in part will be apparent from the exemplary embodiments set forth, or may be learned by practice.

In one aspect of the exemplary embodiments, a method of measuring a location of a communication terminal using an access point and a lamp may include storing location coordinates of a plurality of access points and a location coordinate of a lamp in a storage unit, receiving from the communication terminal identity information that identifies nearby access points from among the plurality of access points and identity information that identifies the lamp, extracting a location coordinate of each of the nearby access points from the storage unit, and calculating the location of the communication terminal using the extracted location coordinates, and correcting the calculated location using the location coordinate of the lamp, as a final location coordinate of the communication terminal.

The correcting may comprise selecting a correction ratio based on the number of the nearby access points, and determining, as the final location coordinate of the communication terminal, a location between the location coordinate of the lamp and the calculated location coordinate according to the correction ratio.

In another aspect of the exemplary embodiments, an apparatus for measuring a location of a communication terminal may include a storage unit that stores location coordinates of a plurality of access points and a location coordinate of a lamp, a receiver that receives from the communication terminal identity information that identifies nearby access points from among the plurality of access points and identity information that identifies the lamp, and a location determining unit that extracts the location coordinates of each of nearby access points among the plurality of access points from the storage unit, calculates the location of the communication terminal using the extracted location coordinates, and corrects the calculated location using the location coordinate of the lamp as a final location coordinate of the communication terminal.

The location determining unit may determine, as the final location coordinate of the communication terminal, a location between the location coordinate of the lamp and the calculated location according to a correction ratio.

DESCRIPTION OF THE DRAWINGS

FIG. 4 is a table of access point information according to an exemplary embodiment.

Figure 1:
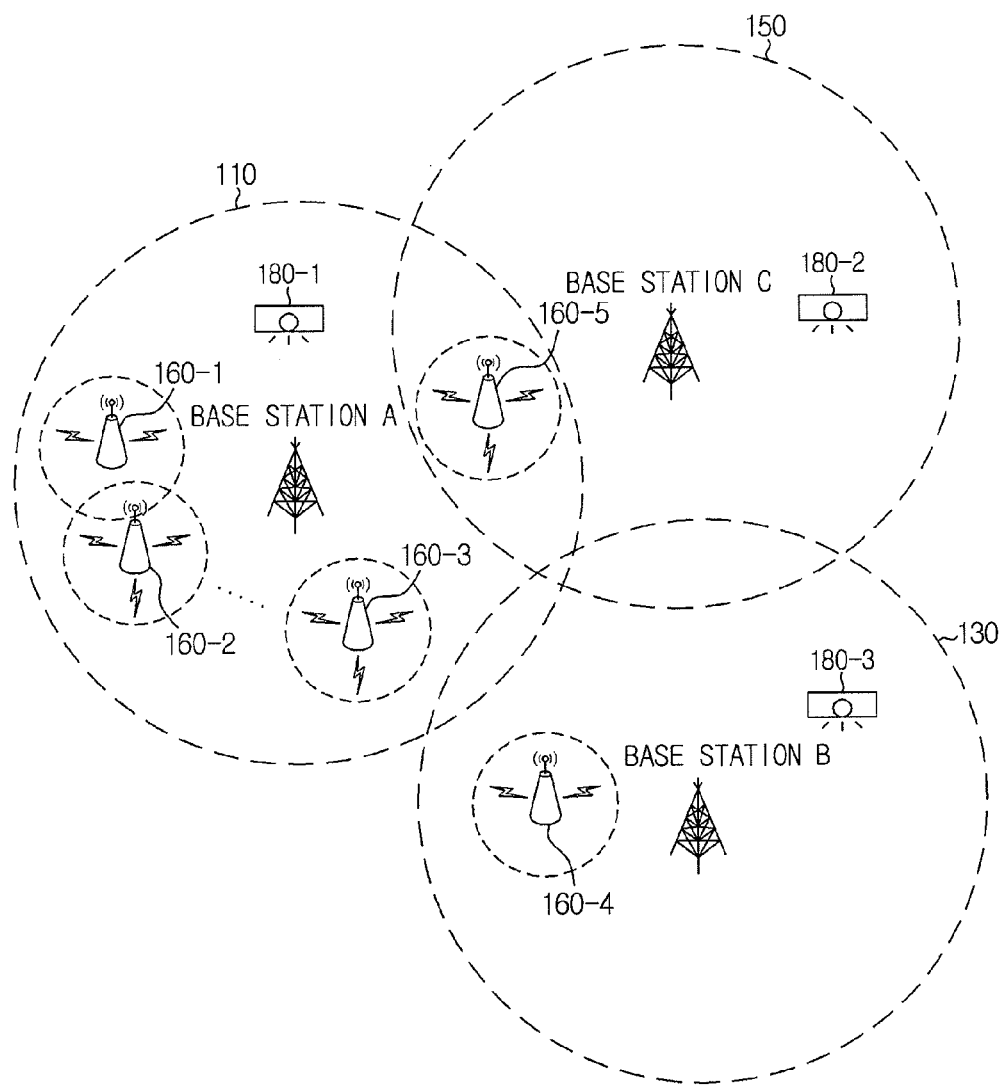
FIG. 1 is a diagram illustrating a communication environment according to an exemplary embodiment.

Throughout the drawings and detailed descriptions, unless otherwise described, the same drawing reference numerals will be understood to refer to the same elements, features, and structures. The relative size and depiction of these elements may be exaggerated for clarity, illustration, and convenience.

DETAILED DESCRIPTION OF EXEMPLARY EMBODIMENTS

The following detailed descriptions are provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a diagram illustrating a communication environment according to an exemplary embodiment.

Referring to FIG. 1, the communication environment includes base stations (A, B, C) of the Global System for Mobile Communications (GSM) (also known as Node Bs of the Universal Mobile Telecommunications System (UMTS)) that provide a mobile communication service, and access points (APs) that provide an Internet service using a wireless local area network (WLAN) system, for example, Wireless Fidelity (WiFi), in an overlapping arrangement. A communication terminal may use various services including voice communication and wireless Internet services via the base station when the communication terminal is mobile. Also, the communication terminal may use an Internet service by connecting to a wired Internet network via the access point.

Generally, the base station has coverage of several kilometers to tens of kilometers in radius, while the access point providing an Internet service by using a WLAN connection has coverage of only several meters in radius. Due to the low costs for purchasing and installing the access points, they are installed in large numbers at various places such as houses, offices, shopping malls, and the like.

As shown in FIG. 1, a plurality of access points 160-1, . . . , 160-5 are placed within respective coverage areas 110, 130, and 150 of base stations. Communication terminal users use an Internet service via the access point 160-1, . . . , 160-5 at locations where a signal of the access point 160-1, . . . , 160-5 is detected by the communication terminal. Also, where a signal of the access point 160-1, . . . , 160-5 is not detected, the communication terminal users use an Internet service via a connection to at least one of the base station.

Recently, with the advancement of smart phone functions, the number of smart phone users is increasing. To provide a high-speed Internet service to smart phones, the number of access points installed is also increasing. As many access points are particularly installed in places with a large floating population, the use of the access points in location measurement is increasing. The accuracy of location measurement using an access point with a narrow coverage is higher than that of a base station with a wide coverage.

Also, a plurality of lamps 180-1, 180-2, and 180-3 are installed as shown in FIG. 1. The lamps 180-1, 180-2, and 180-3 emit light indoors and outdoors, and in particular, the lamps 180-1, 180-2, and 180-3 carry identity codes on the light to identify the lamps 180-1, 180-2, and 180-3. The present invention is not limited to a specific kind of lamp as long as the lamp is capable of carrying an identity code on the light and emitting the light like LEDs.

Figure 2:
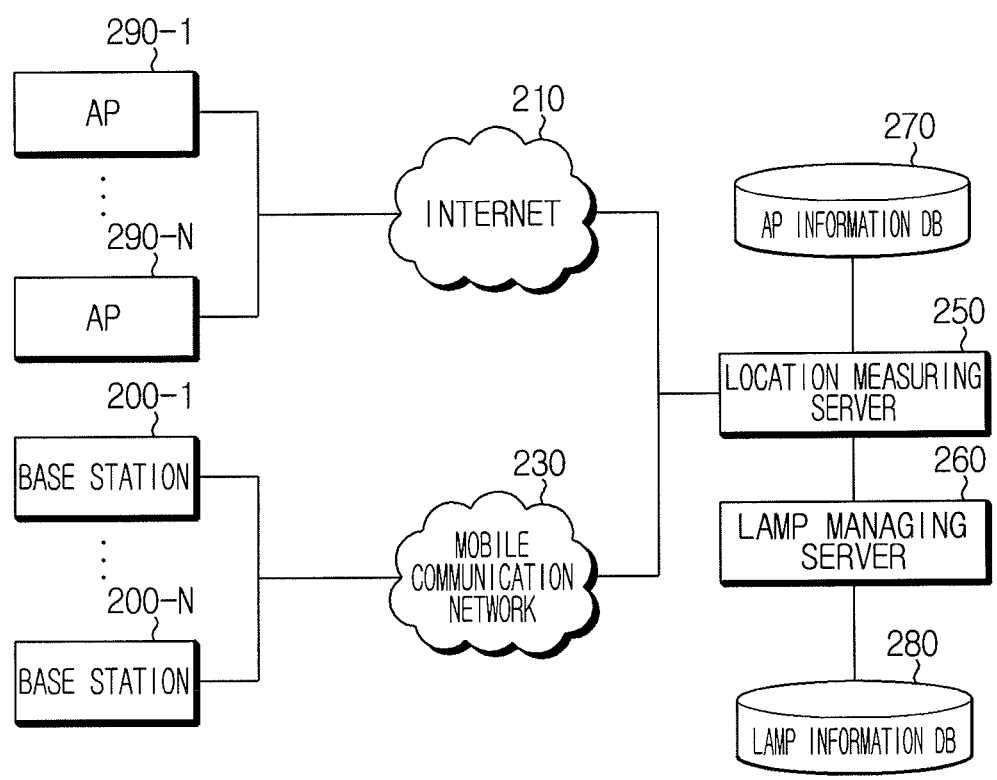
FIG. 2 is a block diagram illustrating a network structure of a location measuring system according to an exemplary embodiment.

FIG. 2 is a block diagram illustrating a network structure of a location measuring system according to an exemplary embodiment.

Referring to FIG. 2, the network may include access points (APs) 290-1, . . . , 290-N providing an Internet service by using a WLAN connection and base stations 200-1, . . . , 200-N providing a mobile communication service. As shown in FIG. 1, the geographic coverage of the access points 290-1, . . . , 290-N and the coverage of the base stations 200-1, . . . , 200-N may overlap. A plurality of access points may be placed within the coverage area of one base station and one access point may be located within coverage areas of multiple base stations.

The access points 290-1, . . . , 290-N are connected to a wired Internet network 210 to provide an Internet service. The base stations 200-1, . . . , 200-N are connected to a mobile communication network 230 to provide a mobile communication service. The wired Internet network 210 and the mobile communication network 230 are linked to each other.

Referring to FIG. 2, the location measuring system includes a location measuring server 250 connected to the Internet network 210 and the mobile communication network 230, an access point information DB 270 managed by the location measuring server 250, a lamp information DB 280 storing lamp information, and a lamp managing server 260 managing the lamp information DB 280.

The access point information DB 270 stores identity information (for example, MAC (Media Access Control) address, SSID (Service Set IDentifier), and the like) of access points installed indoors/outdoors of buildings and location coordinate information that identifies where the access points are installed. Also, the access point information DB 270 stores access point information for a location that is collected by an access point information collecting terminal while the access point information collecting terminal is mobile. The access point information for a location includes collection location information collected by the access point information collecting terminal at a predetermined time cycle while the access point information collecting terminal is mobile, identity information and signal strength of access points detected at the collection locations, and identity information of base stations. A more detailed description will follow later.

The lamp information DB 280 stores installation location coordinates of the lamps 180-1, 180-2, and 180-3 installed at various geographic locations and identity codes mapped to location coordinates of the geographic locations. Preferably, the installation location coordinates of the lamps 180-1, 180-2, and 180-3 are latitude/longitude coordinates.

The lamp managing server 260 manages the location coordinates and identity codes of the lamps 180-1, 180-2, and 180-3 stored in the lamp information DB 280. Also, when the lamp managing server 260 receives a request for a location coordinate of a specific lamp from the location measuring server 250, the lamp managing server 260 searches the lamp information DB 280 and provides the location coordinate to the location measuring server 250.

When the location measuring server 250 receives a request to measure a location of a specific communication terminal, the location measuring server 250 measures a location of the communication terminal using identity information of an access point 290-1, . . . , 290-N accessible by the communication terminal and an identity code of a nearby lamp obtained by the communication terminal. A location measuring method of the location measuring server 250 is described in detail below.

The specific communication terminal is capable of extracting identity codes emitted by the lamps 180-1, 180-2, and 180-3, detecting signals from the nearby access points 290-1, . . . , 290-N, and transmitting the identity codes of the lamps 180-1, 180-2, and 180-3 and information (for example, signal strength and MAC address) of the detected nearby access points 290-1, . . . , 290-N.

Figure 3:
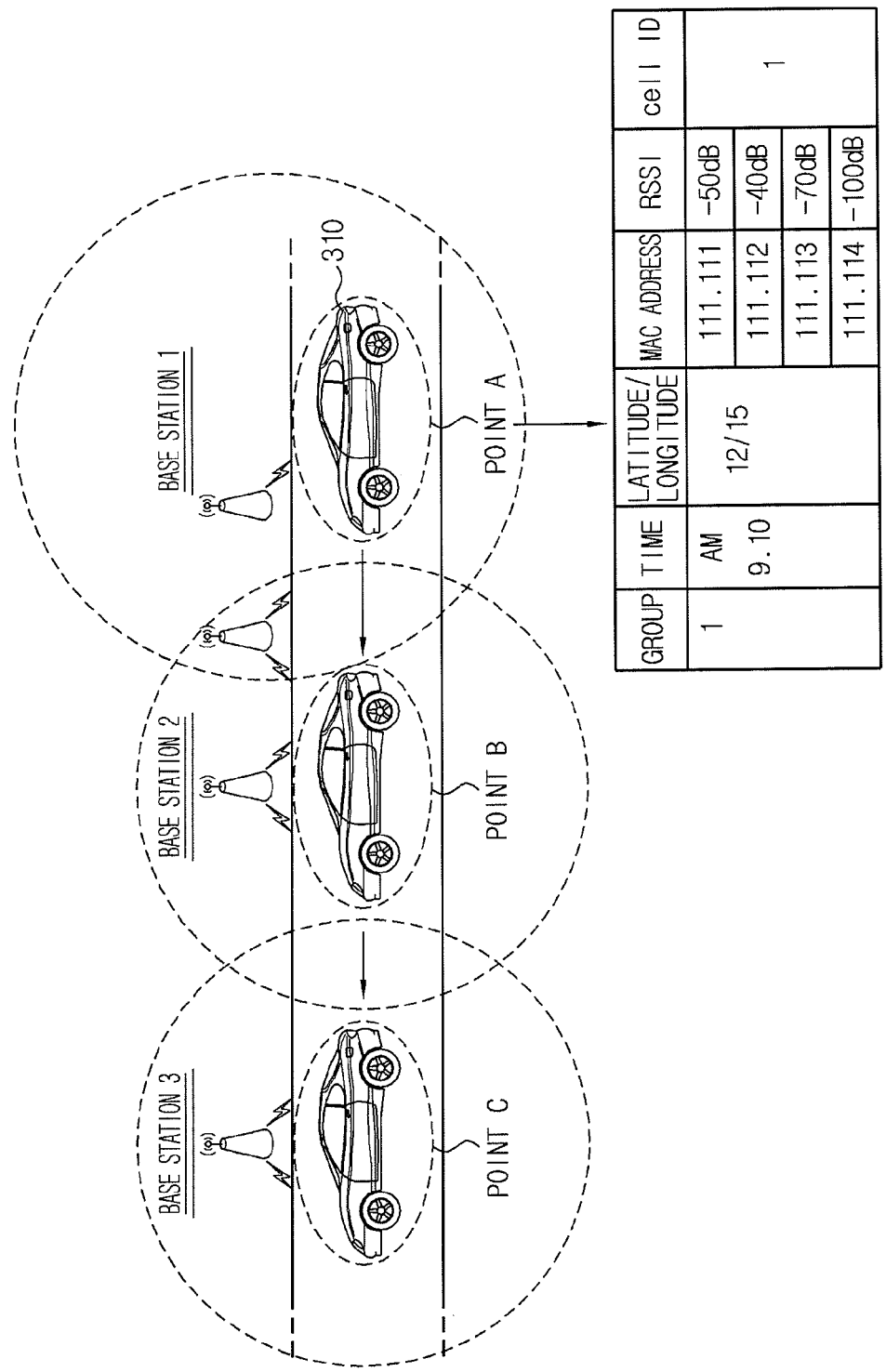
FIG. 3 is a diagram illustrating the collection of access point information according to an exemplary embodiment.

FIG. 3 is a diagram illustrating the collection of access point information for location according to an exemplary embodiment.

As shown in FIG. 3, an access point information collecting terminal mounted in a vehicle 310 collects information by detecting signals from nearby access points at a predetermined time cycle while the vehicle 310 is running. The information collected by the access point information collecting terminal includes collection time, collection location information (for example, latitude/longitude), identity information (for example, MAC address) and signal strength (for example, RSSI (Received Signal Strength Indication)) of an access point which transmits a signal detected at a collection location, and identity information (cell ID or PN (Pseudo Noise) code) of a base station having a coverage area over the corresponding collection location.

Referring to FIG. 3, taking point A as an example, the access point information collecting terminal mounted in the vehicle 310 collects information of an access point which transmits a signal detected at the point A. The access point information collecting terminal collects latitude/longitude information of the point A, collection time, MAC address and signal strength (RSSI) of the access point which transmits the signal detected at the point A, and identity information of a base station which covers the point A. As described above, the access point information collecting terminal collects information of access points detected at every point (A, B, C . . . ) at a predetermined time cycle (for example, every minute) while the vehicle is running.

FIG. 4 is a table of access point information for locations according to an exemplary embodiment. As described above with reference to FIG. 3, the access point information collecting terminal collects information of nearby access points at a predetermined time cycle while running, and the collected access point information for location is shown in FIG. 4. As shown in FIG. 4, the table has a time field 410, a location field 430, a MAC address filed 450, an RSSI field 470, and a cell ID field 490.

The time field 410 records the time at which the access point information collecting terminal collects information of an access point. The location field 430 records collection location information (latitude/longitude information) of the access point information collecting terminal at the time at which the information of the access point is collected. The MAC address field 450 records a MAC address of an access point detected at a collection location. The RSSI field 470 records the signal strength from an access point detected at a collection location. The cell ID field 490 records a cell ID of a base station covering a collection location of the access point information collecting terminal at the time at which the information of the access point is collected. Although FIG. 4 shows only one cell ID for a base station being recorded, a plurality of cell IDs detected at the cell boundary may be recorded.

To measure a location of a communication terminal using an access point, the location measuring method according to the exemplary embodiment employs installation location coordinates (or real geographic location coordinates) where access points are physically installed. Generally, the access points 160 installed by communication service providers have their installation location coordinates given by the communication service providers. However, a personal access point installed by a local user (for example an access point located within a residence) may not be reported to the communication service providers. Accordingly, an installation location coordinate of the personal access point is not known unless the installation location coordinate is identified by an installer. Accordingly, there is a need to estimate an installation location coordinate of an access point of which the installation location coordinate is not identified among access points of which information is collected by the access point information collecting terminal while the access point information collecting terminal is mobile, as described above with reference to FIG. 3.

Hereinafter, a process for estimating an installation location coordinate (or a real location coordinate) of an access point, of which the installation location coordinate is not identified, among access points of which information is collected by the access point information collecting terminal while the access point information collecting terminal is mobile, is described with reference to FIG. 5. That is, an estimated installation location coordinate of an access point is a location coordinate of the access point determined based on an estimated value, but not a real location coordinate of the access point.

Figure 5:
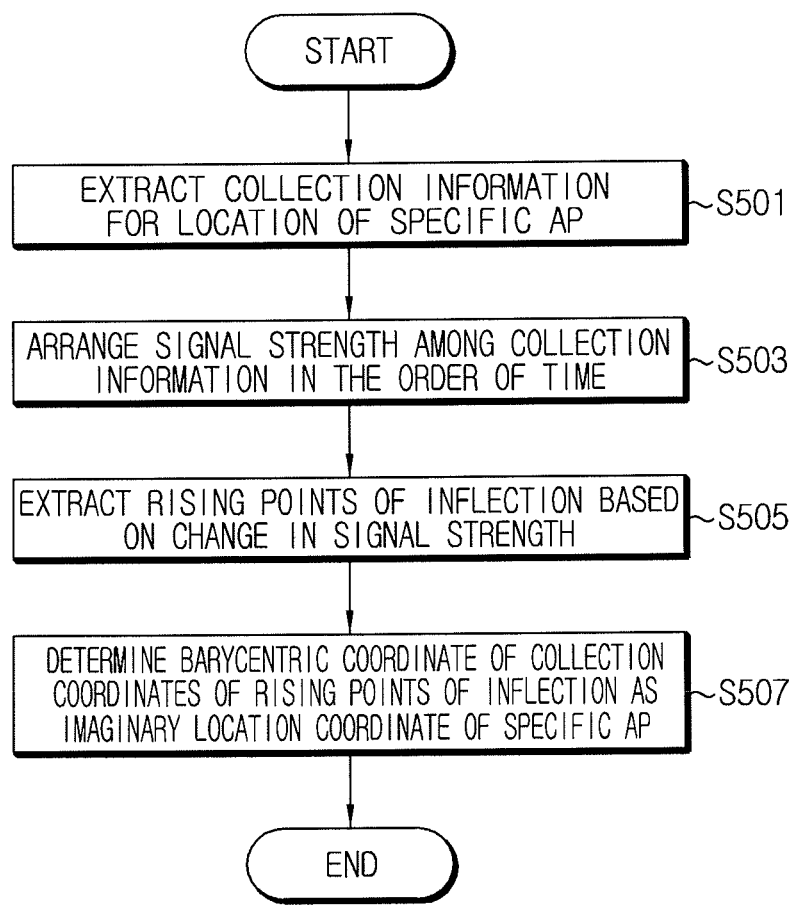
FIG. 5 is a flowchart illustrating a process for determining a location coordinate of an access point in a location measuring server according to an exemplary embodiment.

FIG. 5 is a flowchart illustrating a process for determining a location coordinate of an access point in a location measuring server according to an exemplary embodiment.

Referring to FIG. 5, the access point information collecting terminal collects information by detecting signals from nearby access points at a predetermined time, as described above with reference to FIGS. 3 and 4. The access point information for location collected by the access point information collecting terminal may be transmitted to the location measuring server 250 via the Internet network 210 or the mobile communication network 230. The location measuring server 250 stores the received access point information for location in the access point information DB 270. Alternatively, the access point information for location collected by the access point information collecting terminal may be stored in the access point information DB 270 by an operator.

After the access point information for location is collected, the location measuring server 250 extracts, from the access point information DB 270, collection information for location of a specific access point, of which an installation location coordinate (or a real location coordinate) is not identified, among the collected access point information for location (S501). That is, the location measuring server 250 extracts collection information for locations including information of the specific access point. For example, when a MAC address is '111.112,' as shown in FIG. 4, the location measuring server 250 extracts information of Group 1, Group 2, Group 3, Group 4, and Group N-1 including MAC address '111.112'.

After the collection information for location of the specific access point is extracted as described above, the location measuring server 250 extracts the signal strength (for example, RSSI) among the collection information for locations and chronologically arranges the extracted signal strength in the order of measurement time (S503). For example, referring to FIG. 4, the time sequential arrangement of the signal strength of the access point including MAC address '111.112' is −40 dB, −50 dB, −80 dB, −80 dB, and −40 dB.

Figure 6:
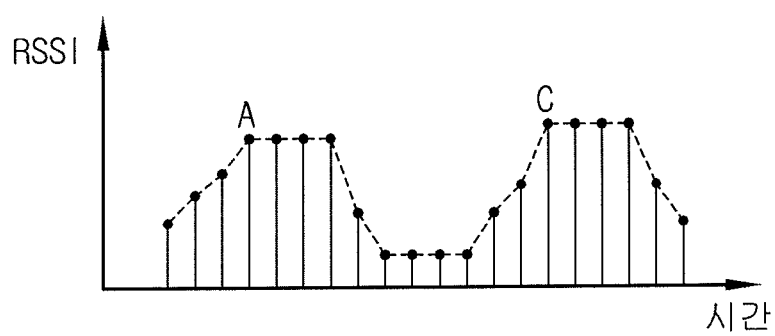
FIG. 6 is a graph illustrating an example of the extraction of a rising point of inflection based on a signal strength distribution of an access point over time according to an exemplary embodiment.

After the location measuring server 250 chronologically arranges the signal strength of the specific access point, the location measuring server 250 extracts a rising point of inflection by analyzing the changes in the signal strength over time (S505). Here, the rising point of inflection is a point where the signal strength rises and reaches the highest. Specifically, FIG. 6 shows an example of the extraction of a rising point of inflection based on a signal strength distribution over time. As shown in FIG. 6, when the signal strength of the access point is arranged in the order of time, the points A and C are where the signal strength rises and reaches the highest, and thus, are extracted as rising points of inflection.

After the rising points of inflection are extracted as described above, the location measuring server 250 calculates a barycentric coordinate of a polygon (or a straight line) by using the apices of collection location coordinates of the rising points of inflection, that is, collection location coordinates where the signal strength of the rising points of inflection is collected. The location measuring server 250 determines the calculated barycentric coordinate as an imaginary location coordinate of the specific access point, and stores the imaginary location coordinate in the access point information DB 270 as the estimated location of the access point (S507). Here, the barycentric coordinate may be replaced by the incenter, the circumcenter, and the like. Also, the barycentric coordinate may be adjusted by applying a weight to the signal strength.

In this exemplary embodiment, the rising point of inflection is used because the rising point of inflection is a point where the signal strength of an access point is highest, and thus, is closest to a location where the access point is actually installed.

The process for determining an imaginary location coordinate of an access point as described with reference to FIG. 5 is performed on all access points, of which installation location coordinates (or real location coordinates) are not identified, among the access points collected by the access point information collecting terminal while the access point information collecting terminal is mobile.

Figure 7:
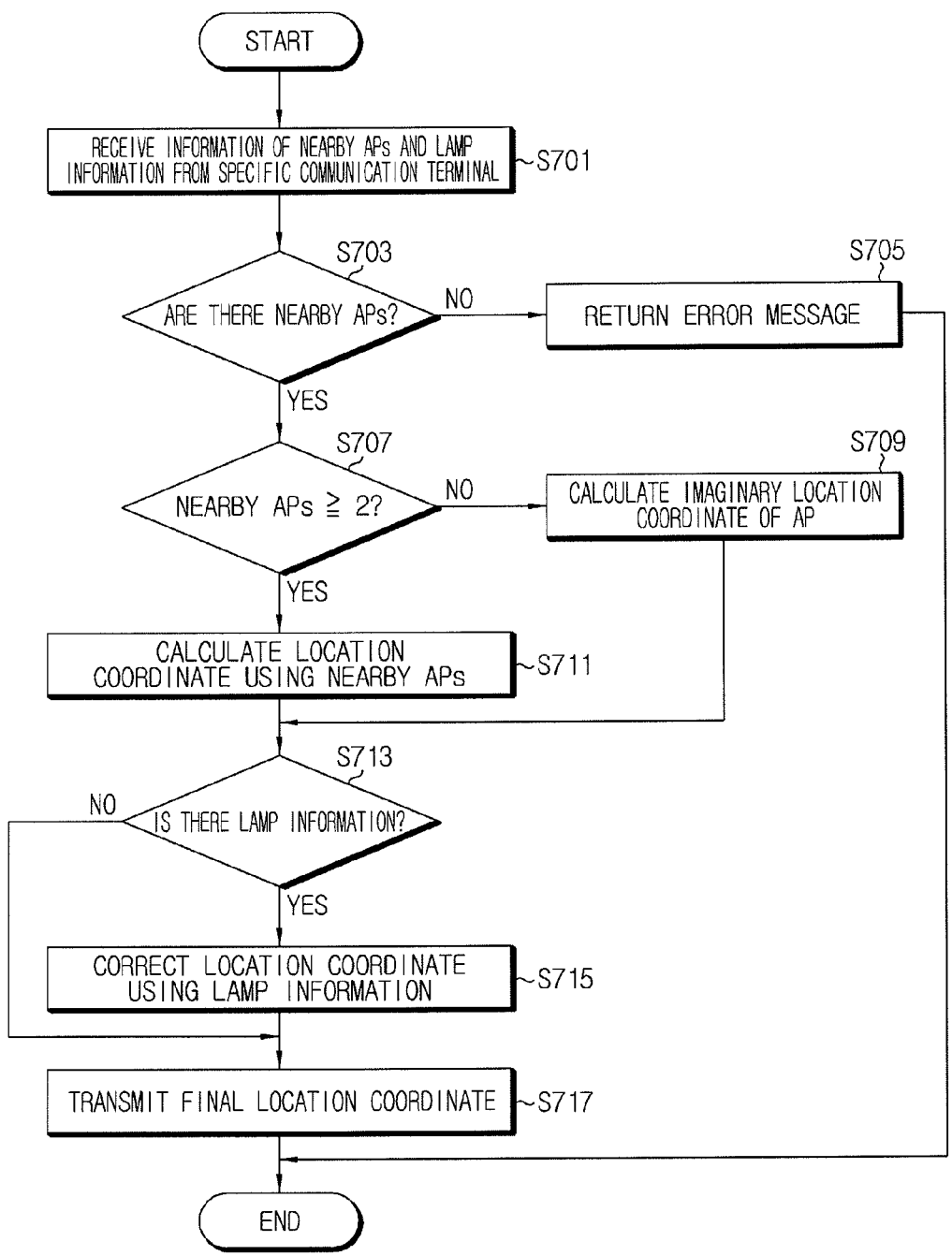
FIG. 7 is a flowchart illustrating a process for measuring a location of a communication terminal in a location measuring server according to an exemplary embodiment.

FIG. 7 is a flowchart illustrating a process for measuring a location of the communication terminal in the location measuring server 250 according to an exemplary embodiment.

Referring to FIG. 7, the location measuring server 250 receives, from a specific communication terminal to be measured for a location of the communication terminal, information for location measurement including, for example, information of access points and an identity code of a nearby lamp detected and extracted by the communication terminal (S701).

After the location measuring server 250 receives the information for location measurement from the specific communication terminal, the location measuring server 250 checks whether information of an access point is included in the information for location measurement (S703). When information of an access point is not included in the information for location measurement, the location measuring server 250 returns an error message (S705). The error message is transmitted to an object that has requested location measurement, for example, the specific communication terminal if the location measurement request is received from the specific communication terminal.

On the contrary, when information of an access point is included in the information for location measurement, the location measuring server 250 checks whether information of at least two access points is included (S707). When information of one access point is included, the location measuring server 250 extracts an imaginary location coordinate of the corresponding access point from the access point information DB 270 (S709). The imaginary location coordinate is described above with reference to FIG. 5. When the access point does not have an imaginary location coordinate, the location measuring server 250 may extract a collection location coordinate where the highest signal strength is detected, among collection location coordinates at which information of the corresponding access point is collected.

When information of at least two access points is included, the location measuring server 250 calculates a location coordinate of the communication terminal using the corresponding access points (S711). A process for calculating a location coordinate of a communication terminal using at least two access points is described below with reference to FIG. 8.

After the location measuring server 250 calculates the location coordinate in S709 or S711, the location measuring server 250 checks whether lamp information, that is, an identity code of a lamp is included in the information for location measurement received in S701 (S713). When lamp information is not included, the location measuring server 250 transmits the location coordinate calculated in S709 or S711 to an object that has requested location measurement, for example, the specific communication terminal if the location measurement request is received from the specific communication terminal.

On the contrary, when lamp information is included, the location measuring server 250 corrects the location coordinate calculated in S709 or S711 using the lamp information (S715). That is, the location measuring server 250 inquires an installation location coordinate of the lamp by transmitting lamp information, that is, an identity code of the lamp to the lamp managing server 260, and when the location measuring server 250 receives, from the lamp managing server 260, the installation location coordinate of the lamp retrieved in the lamp information DB 280 based on the identity code of the lamp, the location measuring server 250 corrects the location coordinate calculated in S709 or S711 towards the installation location coordinate of the lamp.

Figures 11, 12:
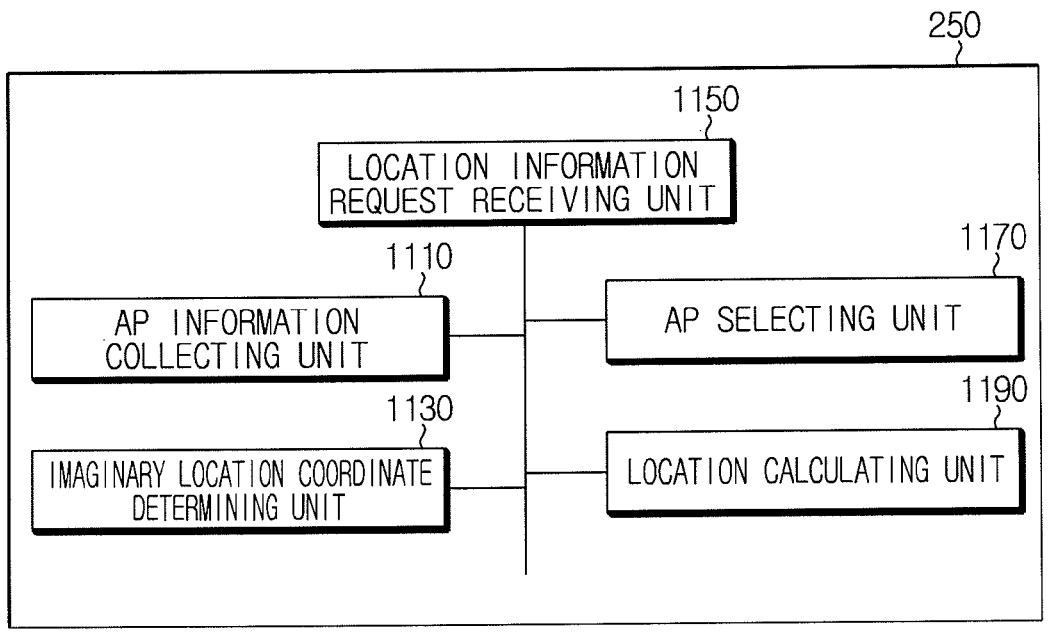
FIG. 11 is a block diagram illustrating a structure of a location measuring server according to an exemplary embodiment.
FIG. 12 is a diagram illustrating an example of a location coordinate correction ratio.

Specifically, the location measuring server 250 corrects the location coordinate based on the number of access points included in the information for location measurement received in S701. FIG. 12 illustrates an example of a location coordinate correction ratio. As shown in FIG. 12, the greater the number of access points used for location measurement, the more the location coordinate calculated in S709 or S711 may be corrected towards the installation location coordinate of the lamp. For example, when the number of access points is nine, a correction ratio is 1:2. That is, a location where a straight line connecting the location coordinate calculated in S709 or S711 and the installation location coordinate of the lamp is divided into 1:2 is determined as a final location coordinate.

After the location measuring server 250 corrects the location coordinate calculated in S709 or S711 using the installation location coordinate of the lamp as described above, the location measuring server 250 transmits the corrected, final location coordinate to an object that has requested location measurement, for example, the specific communication terminal if the location measurement request is received from the specific communication terminal (S717).

Additionally, after the location measuring server 250 calculates the final location coordinate as described with reference to FIG. 7, the location measuring server 250 may calculate an allowable error in radius. That is, the location measuring server 250 may calculate an allowable error radius relative to the final location coordinate. Specifically, the location measuring server 250 may calculate an allowable error radius based on an average of the signal strength of access points used in measuring the location coordinate by the process of FIG. 7 and whether an installation location coordinate of a lamp is reflected. The calculation equation may be as follows:

When installation location coordinate of lamp is reflected
(1) When RSSI_AVERAGE is higher than −90
Radius=(INT)(|(RSSI_AVERAGE +WPS_FACTOR_POINT)|)*LAMP_BASE_VALUE
(2) When RSSI_AVERAGE is between −90 and −95 (not including −95)
Radius=(INT)(|(RSSI_AVERAGE +WPS_FACTOR_POINT)|)*LAMP_BASE_VALUE
(3) When RSSI_AVERAGE is −95 or lower
Radius=(INT)(|(RSSI_AVERAGE +WPS_FACTOR_POINT)|)*LAMP_BASE_VALUE When installation location coordinate of lamp is not reflected
(1) When RSSI_AVERAGE is higher than −90
Radius=(INT)(|(RSSI_AVERAGE +WPS_FACTOR_POINT)|)*LAMP_BASE_VALUE
(2) When RSSI_AVERAGE is between −90 and −95 (not including −95)
Radius=(INT)(|(RSSI_AVERAGE +WPS_FACTOR_POINT)|)*LAMP_90_VALUE
(3) When RSSI_AVERAGE is −95 or lower
Radius=(INT)(|(RSSI_AVERAGE +WPS_FACTOR_POINT)|)*LAMP_95_VALUE Here, 'RSSI_AVERAGE' is an average of the signal strength of access points used for location measurement, and 'WPS_FACTOR_POINT' is a base value of signal strength and in this embodiment, is set as −40 dB. Also, 'LAMP_BASE_VALUE', 'WPS_BASE_VALUE', 'WPS_90_VALUE', and 'WPS_95_VALUE' are each a correction coefficient, and 'LAMP_BASE_VALUE' is smaller than 'WPS_BASE_VALUE' because the precision in location measurement is improved when an installation location coordinate of a lamp is reflected. Also, 'WPS_BASE_VALUE'<'WPS_90_VALUE'<'WPS_95_VALUE'.

Hereinafter, the above step S711 of FIG. 7, that is, a process for calculating a location coordinate using nearby access points is described in detail with reference to FIGS. 8 and 9.

Figure 8:
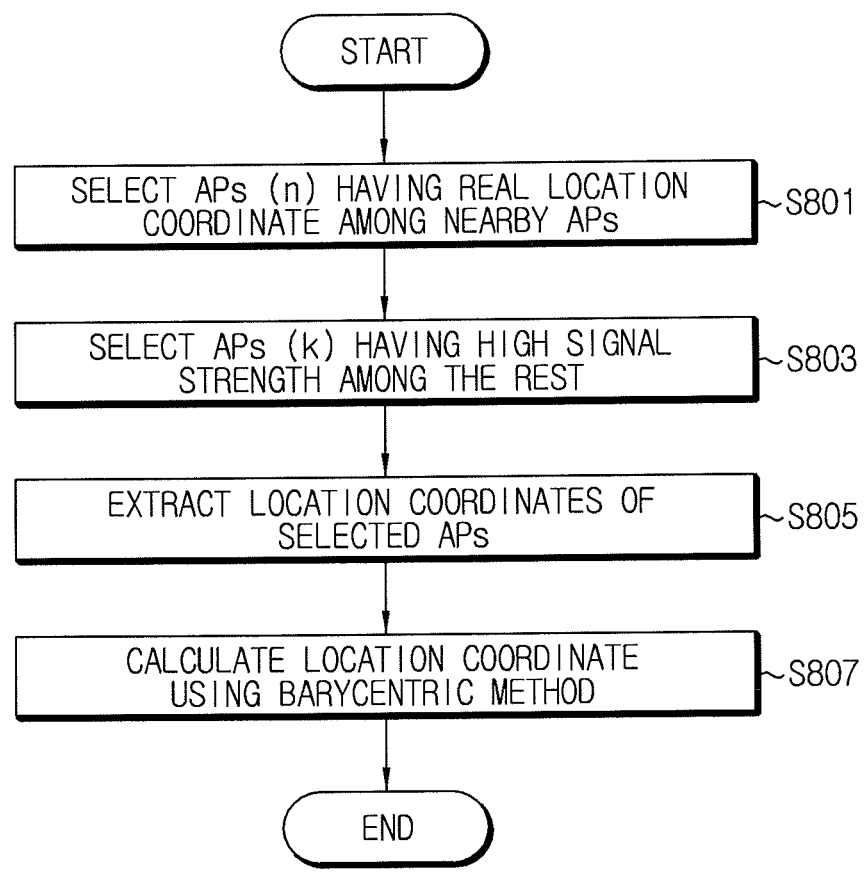
FIG. 8 is a flowchart illustrating a process for measuring a location of a communication terminal in a location measuring server according to another exemplary embodiment.

FIG. 8 is a flowchart illustrating a process for measuring a location of a communication terminal in the location measuring server 250 according to another exemplary embodiment.

Referring to FIG. 8, the location measuring server 250 first selects an access point having an installation location coordinate (or a real location coordinate) among the nearby access points, of which information is received from the specific communication terminal (S801). That is, the location measuring server 250 checks whether there is an access point having a real location coordinate stored in the access point information DB 270, using identity information (for example, MAC address) of the nearby access points. Assume that the number of the selected access points is 'n'.

In this instance, when there is no access point having a real location coordinate, an access point is not selected in this step. When selecting an access point having a real location coordinate, only an access point having a predetermined signal strength or higher may be selected. A low signal strength may be interpreted as being located at a distance away from the communication terminal, and accordingly, an access point having a low signal strength is not selected even though its real location coordinate exists.

Next, the location measuring server 250 selects the top k access points based on signal strength among access points excluding an access point having a real location coordinate (S803). For example, when there are six access points having a real location coordinate among thirty nearby access points, of which information is received from the specific communication terminal, the location measuring server 250 selects the top k access points having high signal strength among twenty four access points.

Here, R=(k+n) is preferably $L^i$ where L is a natural number of 3 or more and 'i' is a natural number of 2 or more. When the number n of access points having a real location coordinate is R in S801, this step S803 may be omitted.

Next, the location measuring server 250 extracts location coordinates of the selected R access points from the access point information DB 270 (S805).

Specifically, for access points having a real location coordinate, the location measuring server 250 extracts their real location coordinates from the access point information DB 270.

For access points not having a real location coordinate, the location measuring server 250 checks whether their imaginary location coordinates are stored in the access point information DB 270, and if so, extracts the imaginary location coordinates from the access point information DB 270.

For access points not having a real location coordinate and an imaginary location coordinate, the location measuring server 250 extracts collection location coordinates of the top 'i' ('i' is the number of access points) access points having high signal strength from the access point information DB 270 based on signal strength for location of the corresponding access points detected at each collection location, as location coordinates of the corresponding access points.

For example, when there are three access points not having a real location coordinate and an imaginary location coordinate in which the signal strength for location of access point A is −40 dB and −50 dB, that of access point B is −50 dB, −60 dB, and −70 dB, and that of access point C is −60 dB and −100 dB, the top three signal strengths are −40 dB and −50 dB of the access point A and −50 dB of the access point B. The location measuring server 250 extracts collection location coordinates where −40 dB and −50 dB of the access point A and −50 dB of the access point B are collected, as location coordinates of the access points not having a real location coordinate and an imaginary location coordinate.

After the location coordinates of the access points selected in S801 and S803 are extracted as described above, the location measuring server 250 calculates a final location coordinate using the extracted location coordinates by the barycentric method (S807). The calculating of a location coordinate using the barycentric method is described in detail with reference to FIG. 9.

Figure 9:
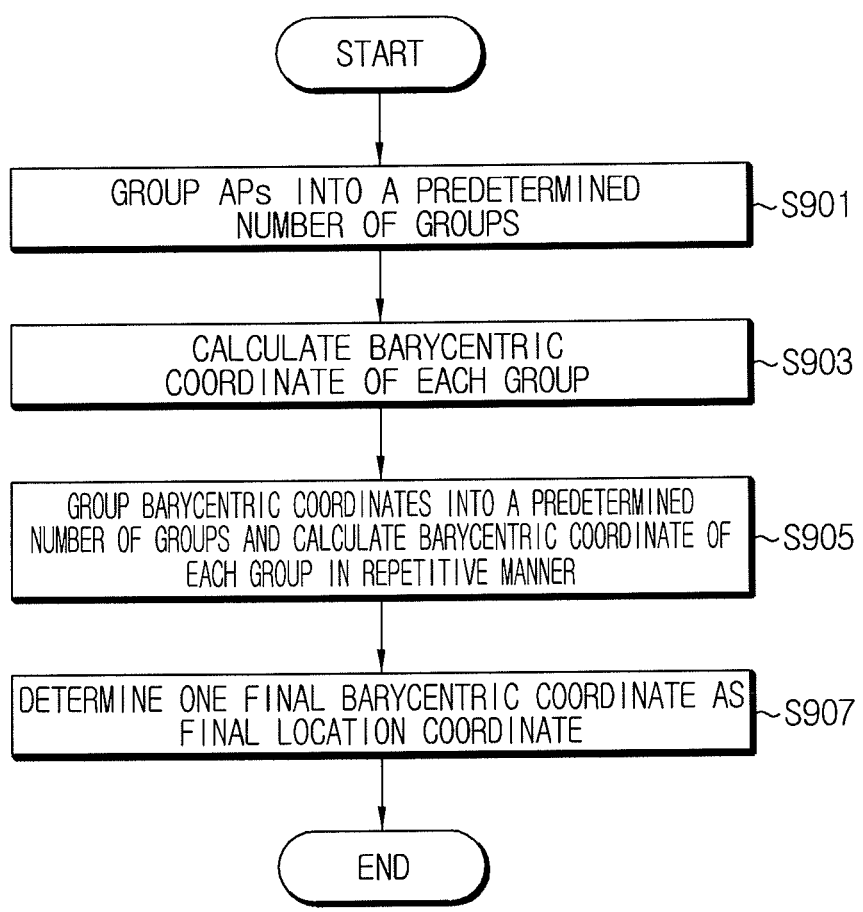
FIG. 9 is a flowchart illustrating a process for calculating a location coordinate using the barycentric method according to an exemplary embodiment.

FIG. 9 is a flowchart illustrating a process for calculating a location coordinate using the barycentric method according to an exemplary embodiment.

As shown in FIG. 9, the location measuring server 250 groups the access points extracted in S805 of FIG. 8 into a predetermined number of groups, in which M (M is a natural number of 3 or more, and is preferably equal to L) access points are selected in each group (S901), and calculates a barycentric coordinate of each group using location coordinates of access points in each group (S903).

Figure 10:
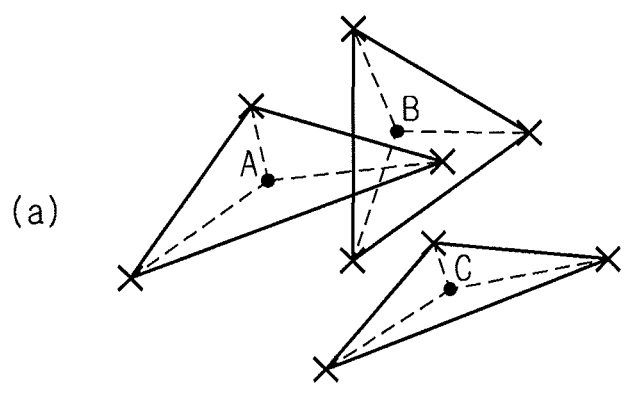
FIG. 10 is a diagram illustrating the calculation of a barycentric coordinate according to an exemplary embodiment.
Figure 10:
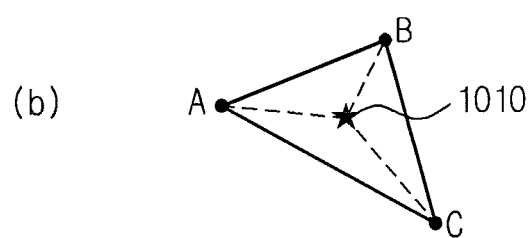

The detailed description is made with reference to FIG. 10. FIG. 10 is a diagram illustrating the calculation of a barycentric coordinate according to an exemplary embodiment. In the embodiment described with reference to FIG. 8, R is 9 and M is 3. In S805, when nine access points are selected, the selected nine access points are grouped into three groups, in which three access points are randomly selected in each group. As shown in FIG. 10(a), a barycentric coordinate of a triangle is calculated, the triangle having location coordinates (real location coordinates or imaginary location coordinates) of three access points in each group as the apices. In FIG. 10(a), 'A', 'B', and 'C' are each a barycentric coordinate of a respective group.

Preferably, access points having a real location coordinate are equally distributed to each group. For example, when there are three access points having a real location coordinate, one access point having a real location coordinate is included in each group. This is to reduce an error in location measurement by including a real location coordinate in each group because the real location coordinate is a location where an access point is actually installed.

Next, after the barycentric coordinates are calculated as described above, the location measuring server 250 groups the calculated barycentric coordinates into a predetermined number of groups, in which M barycentric coordinates are randomly selected in each group, and re-calculates a barycentric coordinate of each group. This process is repeated until one barycentric coordinate is obtained (S905).

Specifically, in FIG. 10(a), the calculated barycentric coordinates are 'A', 'B', and 'C'. Because three barycentric coordinates are sufficient to form a group, further grouping is not necessary. When a barycentric coordinate of a triangle having the three barycentric coordinates as the apices is calculated, one final barycentric coordinate 1010 is obtained as shown in FIG. 10(b).

Finally, the location measuring server 250 determines one final barycentric coordinate 810 obtained by the barycentric method as a final location of the communication terminal (S907).

This embodiment is described based on that R is $L^i$. This is because a polygon (for example, a triangle) of the same pattern is used to calculate a barycentric coordinate in S903 and S905 when M is set to equal L. However, R does not need to equal $L^i$. In S903 and S905 for calculating a barycentric coordinate by grouping, when a number X (M<X<2×M) of barycentric coordinates remain at the end, a final barycentric coordinate may be calculated by forming a polygon having the number X (M<X<2×M) of barycentric coordinates as the apices. Alternatively, a final barycentric coordinate may be calculated by grouping the number of barycentric coordinates into a predetermined number of groups, in which the number of barycentric coordinates in each group may not be equal.

The embodiment described with reference to FIGS. 8 and 9 is described based on nine nearby access points or more. However, in the case of two or three nearby access points, a barycentric coordinate of the two or three nearby access points is determined as a final location coordinate of the communication terminal. In the case of four nearby access points, a barycentric coordinate of three access points among the four nearby access points is calculated first, then a barycentric coordinate of the calculated barycentric coordinate and a location coordinate of the other one access point is calculated and determined as a final location coordinate of the communication terminal. As described above, when the number of nearby access points is nine or less, proper grouping of the access points and calculating of a barycentric coordinate may be performed to obtain a final one location coordinate.

FIG. 11 is a block diagram illustrating a structure of the location measuring server 250 according to an exemplary embodiment.

Referring to FIG. 11, the location measuring server 250 according to an exemplary embodiment includes an access point information collecting unit 1110, an imaginary location coordinate determining unit 1130, a location information request receiving unit 1150, an access point selecting unit 1170, and a location calculating unit 1190.

The access point information collecting unit 1110 receives access point information for location collected by the access point information collecting terminal at a predetermined time cycle, and stores the access point information for location in the access point information DB 270. The access point information collecting unit 1110 may directly receive access point information for location from the access point information collecting terminal via the Internet network 210 or the mobile communication network 230. An example of the access point information for location is shown in FIG. 4.

The imaginary location coordinate determining unit 1130 estimates and determines an installation location coordinate of an access point not having an installation location coordinate based on the access point information for location collected by the access point information collecting unit 1110. The location coordinate estimated and determined by the imaginary location coordinate determining unit 1130 is defined as an imaginary location coordinate.

Specifically, the imaginary location coordinate determining unit 1130 extracts, from the access point information DB 270, collection information for location of a specific access point, of which a real location coordinate is not identified, among the collected access point information for location. Also, after the imaginary location coordinate determining unit 1130 extracts the collection information for location of the specific access point, the imaginary location coordinate determining unit 1130 extracts the signal strength (for example, RSSI) among the collection information for location, arranges the extracted signal strength in the order of time, and analyzes the changes in the signal strength over time to extract a rising point of inflection. Here, the rising point of inflection is a point where the signal strength rises and reaches the highest.

FIG. 6 illustrates an example of the extraction of a rising point of inflection based on a signal strength distribution of an access point over time. As shown in FIG. 6, when the signal strength of the access point is arranged in the order of time, points A and C are where the signal strength rises and reaches the highest, and thus, are extracted as rising points of inflection.

When the rising points of inflection are extracted, the imaginary location coordinate determining unit 1130 calculates a barycentric coordinate of collection location coordinates of the rising points of inflection, that is, collection location coordinates where the signal strength of the rising points of inflection is collected. The imaginary location coordinate determining unit 1130 determines the calculated barycentric coordinate as an imaginary location coordinate of the specific access point, and stores the imaginary location coordinate in the access point information DB 270. Here, the barycentric coordinate may be replaced by the incenter, the circumcenter, and the like.

Accordingly, a real location coordinate or an imaginary location coordinate of each access point is stored in the access point information DB 270.

The location information request receiving unit 1150 receives a location measurement request for a specific communication terminal. The location measurement request may be received from another communication network equipment by the request of another communication terminal. When the location information request receiving unit 1150 receives the location measurement request, the location information request receiving unit 1050 controls the specific communication terminal so as to receive identity information (for example, MAC address or SSID) and signal strength of nearby access points and an identity code of a nearby lamp from the specific communication terminal.

The access point selecting unit 1170 selects R access points among the nearby access points, of which information is received by the location information request receiving unit 1150. Here, R is preferably $L^i$ where L is a natural number of 3 or more and 'i' is a natural number of 2 or more.

When selecting R access points, the access point selecting unit 1170 first selects access points having a real location coordinate by referring to the access point information DB 270, and then selects the other access points having a high signal strength.

Accordingly, when there are R access points having a real location coordinate, only access points having a real location coordinate are selected, and if insufficient, access points having a high signal strength (the signal strength is a value detected and reported by the specific communication terminal) are selected. In this instance, when selecting access points having a real location coordinate, only access points having a predetermined signal strength or higher may be selected. Here, the signal strength is that of nearby access points received by the location information request receiving unit 1150 from the specific communication terminal.

The location calculating unit 1190 extracts location coordinates of the access points selected by the access point selecting unit 1170 from the access point information DB 270, and calculates a final one location coordinate using the extracted location coordinates by the barycentric method.

Specifically, for access points having a real location coordinate, the location calculating unit 1190 extracts their real location coordinates from the access point information DB 270.

For access points not having a real location coordinate, the location calculating unit 1190 checks whether their imaginary location coordinates are stored in the access point information DB 270, and if so, extracts the imaginary location coordinates from the access point information DB 270.

For access points not having a real location coordinate and an imaginary location coordinate, the location calculating unit 1190 extracts collection location coordinates of the top 'i' ('i' is the number of access points) access points having high signal strength based on signal strength for location of the corresponding access points detected at each collection location, as location coordinates of the corresponding access points.

For example, when there are three access points not having a real location coordinate and an imaginary location coordinate, in which the signal strength for location of an access point A is −40 dB and −50 dB, that of an access point B is −50 dB, −60 dB, and −70 dB, and that of an access point C is −60 dB and −100 dB, the top three signal strengths are −40 dB and −50 dB of the access point A and −50 dB of the access point B. The location calculating unit 1190 extracts collection location coordinates where −40 dB and −50 dB of the access point A and −50 dB of the access point B are collected, as location coordinates of the access points not having a real location coordinate and an imaginary location coordinate.

The location calculating unit 1190 groups the access points selected by the access point selecting unit 1170 into a predetermined number of groups, each group composed of randomly selected M (M is a natural number of 3 or more, and is preferably equal to L) access points, and calculates a barycentric coordinate of each group using the extracted location coordinates of the access points. In this instance, the location calculating unit 1190 equally distributes the access points having a real location coordinate to each group.

Also, the location calculating unit 1190 groups the calculated barycentric coordinates into a predetermined number of groups, each group composed of randomly selected M barycentric coordinates, and re-calculates a barycentric coordinate of each group. The location calculating unit 1190 repeats this process until one barycentric coordinate is obtained, and determines the obtained one barycentric coordinate as a final location of the specific communication terminal. In this instance, when lamp information is received from the communication terminal, the determined barycentric coordinate is corrected using the lamp information.

When the location calculating unit 1190 corrects the location coordinate using the lamp information, the location calculating unit 1190 inquires a location coordinate of a lamp by transmitting lamp information, that is, an identity code of the lamp to the lamp managing server 260, and when the location measuring server 250 receives, from the lamp managing server 260, the location coordinate of the lamp retrieved in the lamp information DB 280 based on the identity code of the lamp, the location calculating unit 1190 corrects the calculated location coordinate using the received location coordinate.

When the location calculating unit 1190 corrects the location coordinate using the installation location coordinate of the lamp, the location calculating unit 1190 corrects the location coordinate based on the number of access points. FIG. 12 illustrates an example of a location correction ratio. As shown in FIG. 12, the larger the number of access points used for location measurement, the more the location coordinate calculated using the access points by the barycentric method is corrected towards the installation location coordinate of the lamp. For example, when the number of access points is nine, a correction ratio is 1:2. That is, a location where a straight line connecting the calculated location coordinate and the installation location coordinate of the lamp is divided into 1:2 is determined as a final location coordinate.

When the location calculating unit 1190 calculates a barycentric coordinate by grouping, if a number X (M<X<2×M) of barycentric coordinates remain at the end, the location calculating unit 1190 may calculate one final barycentric coordinate by forming a polygon having the number X (M<X<2×M) of barycentric coordinates as the apices.

Alternatively, the location calculating unit 1190 may calculate one final barycentric coordinate by grouping barycentric coordinates into a predetermined number of groups, in which the number of barycentric coordinates in each group is not equal.

When the number of nearby access points is one, the location calculating unit 1190 may determine a real location coordinate or imaginary location coordinate of the corresponding access point as a location coordinate of the specific communication terminal, and may correct the determined location coordinate based on the installation location coordinate of the lamp.

Additionally, the location calculating unit 1190 may calculate an allowable error radius after measuring the final location coordinate. That is, the location calculating unit 1190 may calculate an allowable error radius relative to the final location coordinate. Specifically, the location calculating unit 1190 calculates an allowable error radius based on an average of the signal strength of access points used for location measurement and whether the installation location coordinate of the lamp is reflected.

The final coordinate calculated by the location calculating unit 1190 is transmitted to an object that have requested location measurement.

The access point described in the exemplary embodiment may be called a micro base station, a pico base station, a UbiCell base station, and the like, depending on the policies of manufacturers or communication providers. Accordingly, it should be understood that the access point of the exemplary embodiment is a gateway point capable of providing an Internet service to a communication terminal through a common Internet line by directly communicating with the communication terminal via local area communications.

Also, it is obvious that the location measuring method of the exemplary embodiment may be applied indoors as well as outdoors. In this instance, while a latitude/longitude coordinate is used as a collection location coordinate outdoors, an imaginary location coordinate may be used as a collection location coordinate indoors. For example, the location measuring method of the exemplary embodiment may measure a location of a communication terminal using the barycentric method by setting imaginary location coordinates on each floor of a building classified by coordinates and collecting information of access points at each coordinate.

The method of the exemplary embodiment may be recorded as computer-readable program codes in non-transitory computer-readable media (CD ROM, random access memory (RAM), read-only memory (ROM), floppy disks, hard disks, magneto-optical disks, and the like) including program instructions to implement various operations embodied by a computer. Alternatively, the computer-readable media may be a transmission media as carrier waves or signals for transmission over a network, such as the Internet.

The apparatuses of the exemplary embodiments, for example the location measuring server 250, may include a bus coupled to every unit of the apparatus, at least one processor (e.g., central processing unit, microprocessor, etc.) that is connected to the bus for controlling the operations of the apparatuses to implement the above-described functions and executing commands, and a memory connected to the bus to store the commands, received messages, and generated messages. The access point information DB 270 may be embodied as a database stored in a memory.

While this specification contains many features, the features should not be construed as limitations on the scope of the disclosure or of the appended claims. Certain features described in the context of separate exemplary embodiments can also be implemented in combination. Conversely, various features described in the context of a single exemplary embodiment can also be implemented in multiple exemplary embodiments separately or in any suitable subcombination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under any environment. Also, it should be understood that all exemplary embodiments do not require the distinction of various system components made in one exemplary embodiment. The program components and systems may be generally implemented as a single software product or multiple software product packages.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A method of measuring a location of a communication terminal, the method comprising:
    storing location coordinates of a plurality of access points and a location coordinate of a lamp in a storage unit;
    receiving from the communication terminal identity information that identifies nearby access points from among the plurality of access points and identity information that identifies the lamp;
    extracting a location coordinate of each of the nearby access points from the storage unit, and calculating the location of the communication terminal using the extracted location coordinates; and
    correcting the calculated location using the location coordinate of the lamp, as a final location coordinate of the communication terminal,
    wherein the correcting comprises:
    selecting a correction ratio based on a number of extracted location coordinates; and
    determining a location coordinate where a straight line connecting a calculated location coordinate and the location coordinate of the lamp is divided into the correction ratio, as the final location coordinate of the communication terminal.

2. The method according to claim 1, wherein the selecting of the correction ratio comprises selecting the correction ratio based on a number of the nearby access points.

3. The method according to claim 1, further comprising:
    receiving from the communication terminal signal strengths of signals received by the communication terminal from the nearby access points;
    calculating an error radius based on an average of the signal strengths.

4. The method according to claim 1, wherein the calculating comprises:
    selecting from among the nearby access points a predetermined number of nearby access points;
    extracting location coordinates of each of the selected nearby access points from the storage unit;
    calculating a barycentric coordinate using the extracted location coordinates of the predetermined number of nearby access points; and
    determining the calculated barycentric coordinate as the location of the communication terminal.

5. The method according to claim 4, wherein the calculating of the barycentric coordinate comprises:
    grouping the location coordinates of the nearby access points;
    calculating a barycentric coordinate of each of the groups of locations coordinates; and grouping the calculated barycentric coordinates and calculating a barycentric coordinate of each group of the calculated barycentric coordinates.

6. The method according to claim 1, wherein the storing comprises:
storing first location coordinates of first access points among the plurality of access points at which the first access points are located;
estimating second location coordinates of second access points among the plurality of access points; and
setting the location coordinate of the lamp as third location coordinates of third access points among the plurality of access points.

7. The method according to claim 6, wherein the setting comprises setting for each of the third access points a collection location coordinate at which a highest signal strength is received from the third access points by the communication terminal.

8. The method according to claim 1, wherein the storing comprises:
collecting strengths of signals received by the communication terminal from the plurality of access points;
extracting rising points of inflection of the strengths of signals by analyzing changes in the signal strengths for the plurality of access points; and
determining estimated location coordinates of the plurality of access points based on the extracted rising points of inflection, and storing the determined estimated location coordinates in the storage unit as the location coordinates of the plurality of access points.

9. The method according to claim 8, wherein the calculating comprises calculating the location coordinate of the communication terminal using the estimated location coordinates of the nearby access points.

10. An apparatus for measuring a location of a communication terminal, the apparatus comprising:
a storage unit that stores location coordinates of a plurality of access points and a location coordinate of a lamp;
a receiver that receives from the communication terminal identity information that identifies nearby access points from among the plurality of access points and identity information that identifies the lamp; and
a location determining unit that extracts the location coordinates of each of nearby access points among the plurality of access points from the storage unit, calculates the location of the communication terminal using the extracted location coordinates, and corrects the calculated location using the location coordinate of the lamp as a final location coordinate of the communication terminal,
wherein the location determining unit selects a correction ratio based on a number of the extracted location coordinates and determines a location coordinate where a straight line connecting a calculated location coordinate and the location coordinate of the lamp is divided into the correction ratio, as the final location coordinate of the communication terminal.

11. The apparatus for measuring a location of a communication terminal using an access point and a lamp according to claim 10, wherein the location determining unit selects the correction ratio based on a number of the nearby access points.

12. The apparatus according to claim 10, wherein the location determining unit further calculates an error radius based on an average of signal strengths of signals received from the communication terminal from the nearby access points.

13. The apparatus according to claim 10, wherein the location determining unit calculates a barycentric coordinate using the location coordinates of the nearby access points, and determines the calculated barycentric coordinate as the location coordinate of the communication terminal.

14. The apparatus according to claim 13, wherein the location determining unit groups the location coordinates of the nearby access points, calculates a barycentric coordinate of each of the groups of the location coordinates, groups the calculated barycentric coordinates, and calculates a barycentric coordinate of each group of the calculated barycentric coordinates.

15. The apparatus according to claim 10, wherein the location determining unit stores in the storage unit first location coordinates of first access points among the plurality of access points, estimates second location coordinates of second access points among the plurality of access points, and sets the location coordinate of the lamp as location coordinates of third access points among the plurality of access points.

16. The apparatus according to claim 15, wherein the location determining unit sets for each of the third access points a collection location coordinate at which a highest signal strength is received from the third access points by the communication terminal.

17. The apparatus according to claim 10, further comprising:
a collector that collects strengths of signals received by the communication terminal from the plurality of access points; and
an estimator that extracts rising points of inflection of the strengths of signals by analyzing changes in the signal strengths for the plurality of access points, and determines estimated location coordinates of the plurality of access points based on the extracted rising points of inflection, and stores the estimated location coordinates in the storage unit as the location coordinates of the plurality of access points.

* * * * *